(12) United States Patent
Schoene et al.

(10) Patent No.: US 11,909,239 B2
(45) Date of Patent: *Feb. 20, 2024

(54) WIRELESS CHARGING DOCK

(71) Applicant: Voyetra Turtle Beach, Inc., White Plains, NY (US)

(72) Inventors: Thomas Michael Schoene, San Diego, CA (US); Scot Robert Cochran, San Diego, CA (US); Nicholas Richard Bourne, Hertfordshire (GB)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,572

(22) Filed: Jun. 7, 2022

(65) Prior Publication Data

US 2022/0302752 A1 Sep. 22, 2022

Related U.S. Application Data

(63) Continuation of application No. 16/897,970, filed on Jun. 10, 2020, now Pat. No. 11,394,229, which is a (Continued)

(51) Int. Cl.
*H02J 7/00* (2006.01)
*H04W 52/02* (2009.01)
(Continued)

(52) U.S. Cl.
CPC .......... *H02J 7/0042* (2013.01); *H02J 7/0013* (2013.01); *H02J 7/0044* (2013.01); *H02J 7/00714* (2020.01); *H02J 50/00* (2016.02); *H02J 50/10* (2016.02); *H04R 1/1025* (2013.01); *H04R 1/1041* (2013.01); *H04W 52/0235* (2013.01);
(Continued)

(58) Field of Classification Search
CPC ...... H02J 7/0042; H02J 7/0013; H02J 7/0044; H02J 7/00714; H02J 50/00; H02J 50/10; H02J 7/00034; H02J 7/007182; H02J 2310/22; H04R 1/1025; H04R 1/1041;
(Continued)

(56) References Cited

U.S. PATENT DOCUMENTS 5,396,551 A 3/1995 Lucey
7,110,798 B2 9/2006 Nassimi
(Continued)

*Primary Examiner* — M Baye Diao
(74) *Attorney, Agent, or Firm* — McAndrews, Held & Malloy, Ltd.

(57) ABSTRACT

A method and system for a headset wireless charging dock, where the charging dock comprises a radio, a coil, and a proximity sensor. The method may comprise sensing a presence of a headset using the proximity sensor, wirelessly charging a battery in the headset utilizing the coil, and wirelessly communicating commands, using the radio, to the headset to power down when fully charged. The command may be communicated to the headset utilizing a protocol and a RF radio used by the headset to receive audio signals. The command communicated to the headset may power down audio processing circuitry in the headset. The charging induction coil may be inductively coupled to a coil in the headset to wirelessly charge the battery in the headset. The proximity sensor may comprise a Hall sensor.

20 Claims, 9 Drawing Sheets

Related U.S. Application Data continuation of application No. 16/293,211, filed on Mar. 5, 2019, now Pat. No. 10,693,309, which is a continuation of application No. 15/596,023, filed on May 16, 2017, now Pat. No. 10,224,736, which is a continuation of application No. 14/728,433, filed on Jun. 2, 2015, now Pat. No. 9,653,940.

(51) Int. Cl.
  *H02J 50/10* (2016.01)
  *H02J 50/00* (2016.01)
  *H04R 1/10* (2006.01)

(52) U.S. Cl.
  CPC ..... *H02J 7/00034* (2020.01); *H02J 7/007182* (2020.01); *H02J 2310/22* (2020.01); *H04R 1/1008* (2013.01); *H04R 2420/07* (2013.01); *Y02D 30/70* (2020.08)

(58) Field of Classification Search
  CPC ............. H04R 1/1008; H04R 2420/07; H04W 52/0235; Y02D 30/70
  See application file for complete search history.

(56) References Cited

U.S. PATENT DOCUMENTS

| | | | |
|---|---|---|---|
| 7,149,552 B2 | 12/2006 | Lair | |
| 8,099,141 B2 | 1/2012 | Janik | |
| 8,170,623 B2 | 5/2012 | Dorogusker | |
| 8,335,545 B2 | 12/2012 | Ham | |
| 8,385,822 B2 | 2/2013 | Chatterjee | |
| 8,903,456 B2 | 12/2014 | Chu | |
| 9,002,372 B2 | 4/2015 | Shakespeare | |
| 9,143,590 B2 | 9/2015 | Goldman | |
| 9,276,642 B2 | 3/2016 | Shostak | |
| 9,293,927 B2 | 3/2016 | Soar | |
| 9,331,518 B2 | 5/2016 | Walley | |
| 9,431,839 B2 | 8/2016 | Suomela | |
| 9,653,940 B2 | 5/2017 | Schoene et al. | |
| 10,224,736 B2 | 3/2019 | Schoene et al. | |
| 10,567,865 B2* | 2/2020 | Kulavik | H04R 1/1041 |
| 10,693,309 B2 | 6/2020 | Schoene et al. | |
| 2003/0100274 A1 | 5/2003 | Brown | |
| 2007/0032274 A1* | 2/2007 | Lee | H04R 1/1025 455/575.2 |
| 2010/0062731 A1* | 3/2010 | Ham | G06F 1/1632 455/90.3 |
| 2010/0137038 A1 | 6/2010 | Scholz | |
| 2013/0278204 A1 | 10/2013 | Howard | |
| 2014/0091633 A1 | 4/2014 | Walley | |
| 2014/0273851 A1 | 9/2014 | Donaldson | |
| 2014/0295758 A1 | 10/2014 | Pederson | |
| 2015/0038197 A1 | 2/2015 | Skipper | |
| 2015/0091508 A1 | 4/2015 | Meunier | |
| 2015/0214749 A1 | 7/2015 | Park | |
| 2015/0329318 A1* | 11/2015 | Cambruzzi | B66B 1/32 188/164 |
| 2016/0218553 A1* | 7/2016 | He | H02J 7/0044 |
| 2020/0062731 A1 | 3/2020 | Ham et al. | |

\* cited by examiner

WIRELESS CHARGING DOCK

CLAIM OF PRIORITY

This application is a continuation of application Ser. No. 16/897,970 filed on Jun. 10, 2020, which is a continuation of application Ser. No. 16/293,211 filed on Mar. 5, 2019, now U.S. Pat. No. 10,693,309, which is a continuation of application Ser. No. 15/596,023 filed on May 16, 2017, now U.S. Pat. No. 10,224,736, which is a continuation of application Ser. No. 14/728,433, filed on Jun. 2, 2015, now U.S. Pat. No. 9,653,940. The aforementioned documents are hereby incorporated herein by reference in its their entirety.

INCORPORATION BY REFERENCE

N/A

TECHNICAL FIELD

Aspects of the present application relate to audio headsets, and more specifically, to methods and systems for a headset wireless charging dock.

BACKGROUND

Limitations and disadvantages of conventional approaches to headset charging will become apparent to one of skill in the art, through comparison of such approaches with some aspects of the present method and system set forth in the remainder of this disclosure with reference to the drawings.

BRIEF SUMMARY

Methods and systems are provided for a headset wireless charging dock, substantially as illustrated by and/or described in connection with at least one of the figures, as set forth more completely in the claims.

DETAILED DESCRIPTION

Certain aspects of the disclosure may be found in a headset wireless charging dock. Example aspects of the disclosure may comprise, in a charging dock that comprises a radio frequency (RF) radio, a charging induction coil, and a proximity sensor: sensing a presence of a headset using the proximity sensor, wirelessly charging a battery in the headset utilizing the charging induction coil, and wirelessly communicating commands, using the RF radio, to the headset to power down at least a portion of circuitry in the headset. Commands may be communicated to the headset utilizing a protocol used by the headset to receive audio signals. The command may be communicated to a RF radio in the headset that is used to receive audio signals. The command communicated to the headset may power down audio processing circuitry in the headset. The charging induction coil may be inductively coupled to a coil in the headset to wirelessly charge the battery in the headset. The proximity sensor may comprise a Hall sensor. A power down command may be communicated to the headset when the charging dock senses the battery in the headset is fully charged. The battery in the headset being fully charged may be sensed by a measurement of current in the charging induction coil or by receiving a charging complete message from the headset.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1A:
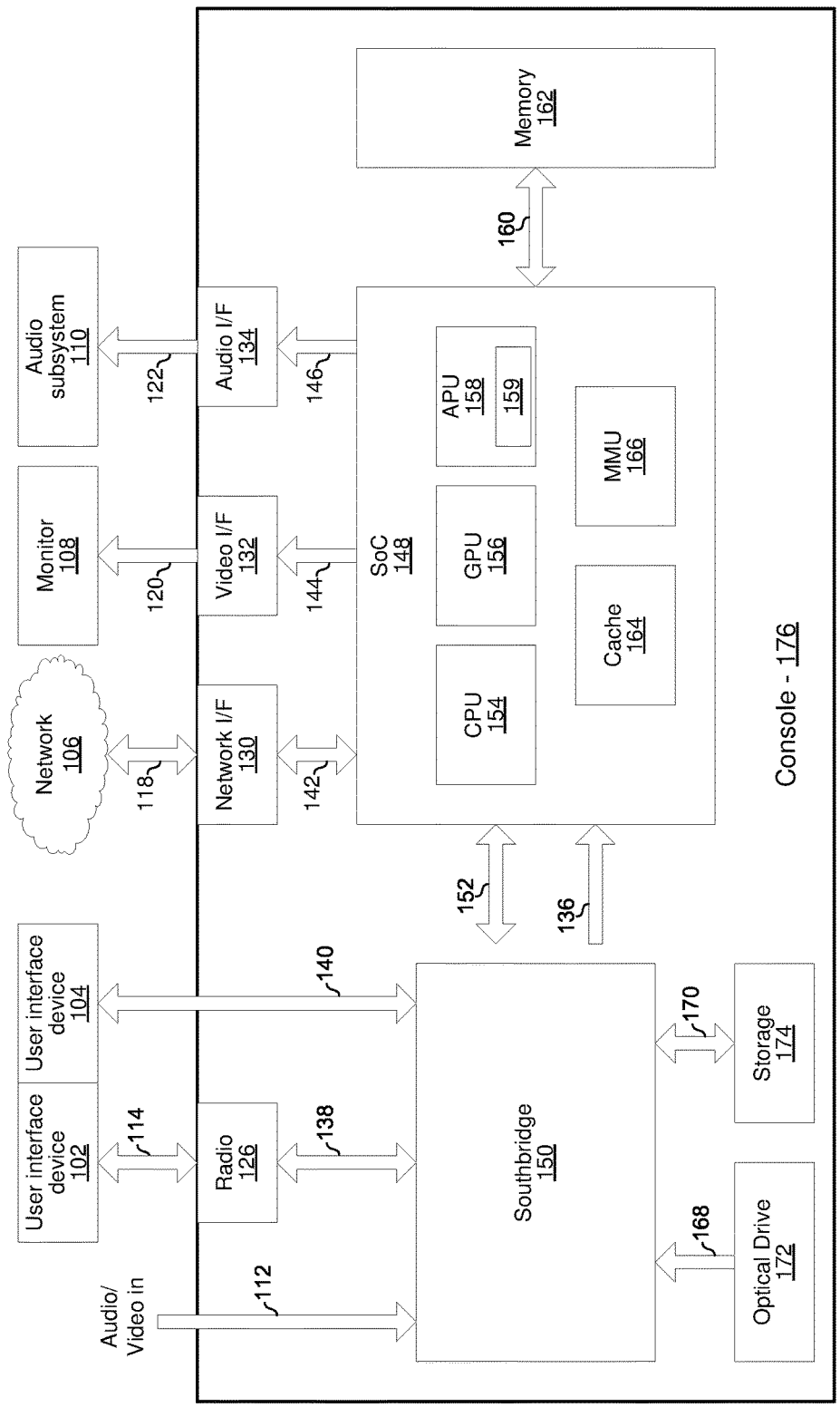
FIG. 1A depicts an example gaming console.

Referring to FIG. 1A, there is shown game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a radio 126, network interface 130, video interface 132, audio interface 134, southbridge 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various busses/links 136, 128, 142, 144, 146, 152, 160, 169, and 170.

The southbridge 150 comprises circuitry that supports one or more data bus protocols such as High-Definition Multimedia Interface (HDMI), Universal Serial Bus (USB), Serial Advanced Technology Attachment 2 (SATA 2), embedded multimedia card interface (e.MMC), Peripheral Component Interconnect Express (PCIe), or the like. The southbridge 150 may receive audio and/or video from an external source via link 112 (e.g., HDMI), from the optical drive (e.g., Blu-Ray) 172 via link 168 (e.g., SATA 2), and/or from storage 174 (e.g., hard drive, FLASH memory, or the like) via link 170 (e.g., SATA 2 and/or e.MMC). Digital audio and/or video is output to the SoC 148 via link 136 (e.g., CEA-861-E compliant video and IEC 61937 compliant audio). The southbridge 150 exchanges data with radio 126 via link 138 (e.g., USB), with external devices via link 140 (e.g., USB), with the storage 174 via the link 170, and with the SoC 148 via the link 152 (e.g., PCIe).

The radio 126 comprises circuitry operable to communicate in accordance with one or more wireless standards such as the IEEE 802.11 family of standards, the Bluetooth family of standards, and/or the like.

The network interface 130 may comprise circuitry operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise circuitry operable to communicate video in accordance with one or more wired or wireless video transmission standards. For example, the video interface 132 may receive CEA-861-E compliant video data via link 144 and encapsulate/format/etc., the video data in accordance with an HDMI standard for output to the monitor 108 via an HDMI link 120.

The audio interface 134 may comprise circuitry operable to communicate audio in accordance with one or more wired or wireless audio transmission standards. For example, the audio interface 134 may receive CEA-861-E compliant video data via link 144 and encapsulate/format/etc. The video data in accordance with an HDMI standard for output to the monitor 108 via an HDMI link 120.

The central processing unit (CPU) 154 may comprise circuitry operable to execute instructions for controlling/coordinating the overall operation of the game console 176. Such instructions may be part of an operating system of the console and/or part of one or more software applications running on the console.

The graphics processing unit (GPU) 156 may comprise circuitry operable to perform graphics processing functions such as compression, decompression, encoding, decoding, 3D rendering, and/or the like.

The audio processing unit (APU) 158 may comprise circuitry operable to perform audio processing functions such as volume/gain control, compression, decompression, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or non-volatile memory) 159 which stores parameter settings that affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may also comprise settings for various charging modes for a headset coupled to the console. For example, certain circuitry may be powered down when in a charging mode. The parameter settings may be modified via a graphical user interface (GUI) of the console and/or via an application programming interface (API) provided by the console 176.

The cache memory 164 comprises high-speed memory (typically DRAM) for use by the CPU 154, GPU 156, and/or APU 158. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher-speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to a user interface device 102, a user interface device 104, a network 106, a monitor 108, and audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, and/or the like). The user interface device 102 communicates with the game console 176 via the wired link 140 (e.g., USB or the like).

The network 160 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuitry. The game console 176 sends audio to the subsystem 110 via link(s) 122 (e.g., S/PDIF for digital audio or "line out" for analog audio). Additional details of an example audio subsystem 110 are described below.

Figure 1B:
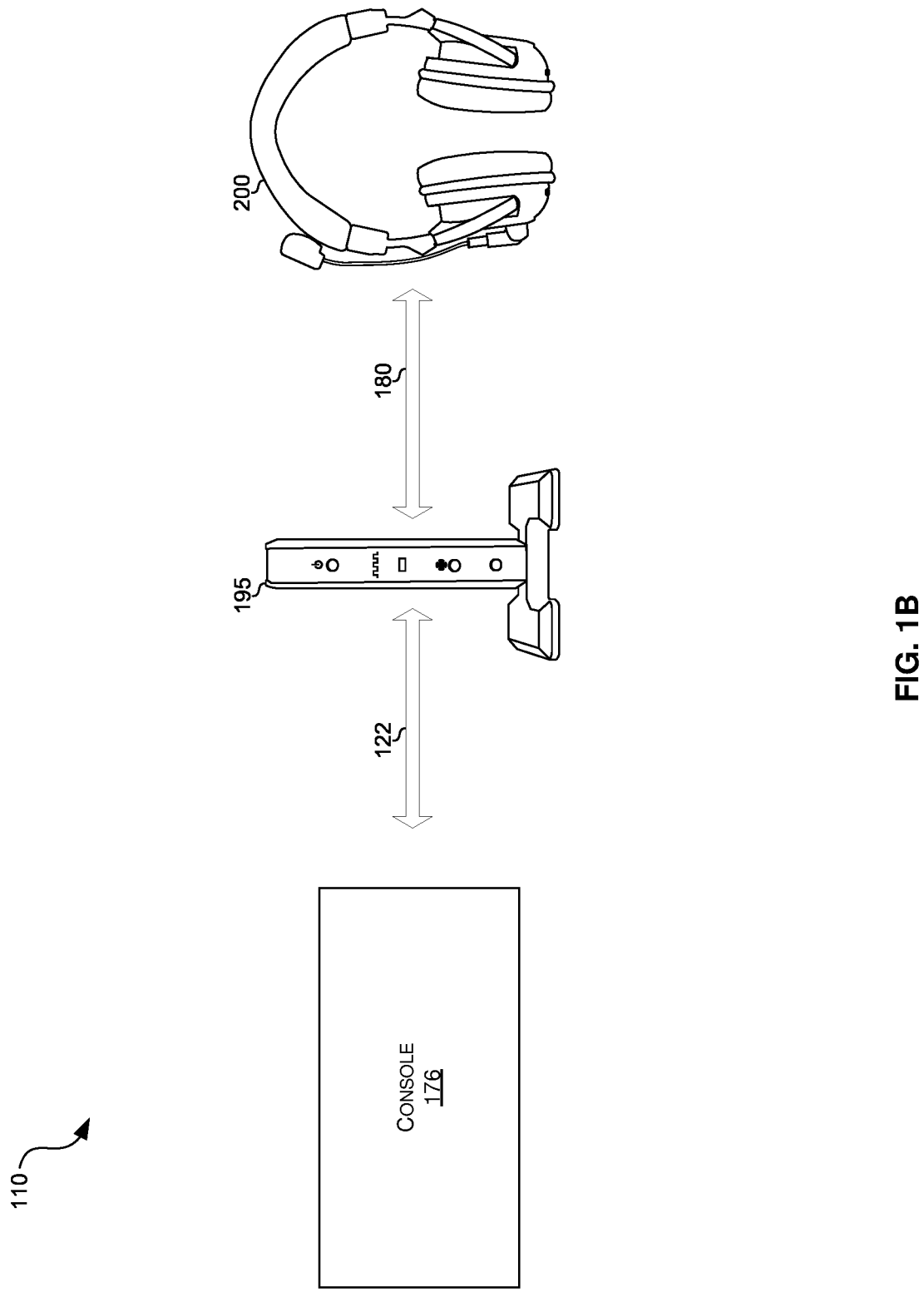
FIG. 1B depicts an example gaming audio subsystem comprising a headset and an audio basestation.

FIG. 1B depicts an example gaming audio subsystem comprising a headset and an audio basestation. Shown are a headset 200 and an audio basestation 195. The headset 200 communicates with the basestation 195 via a link 180 and the basestation 195 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C.

Referring to FIG. 1C, again shown is the console 176 connected to a plurality of peripheral devices and a network 106. The example peripheral devices shown include a monitor 108, a user interface device 102, a headset 200, an audio basestation 195, and a multi-purpose device 192.

The monitor 108 and user interface device 102 are as described above. An example implementation of the headset 200 is described below with reference to FIGS. 2A-2C. In an example scenario, the headset 200 may comprise directional microphones that may be configured based on the audio environment around the headset 200.

The multi-purpose device 192 may be, for example, a tablet computer, a smartphone, a laptop computer, or the like that runs an operating system such as Android, Linux, Windows, iOS, OSX, or the like. Hardware (e.g., a network adaptor) and software (i.e., the operating system and one or more applications loaded onto the device 192) may configure the device 192 for operating as part of the GPN 190. For example, an application running on the device 192 may cause display of a graphical user interface via which a user can access gaming-related data, commands, functions, parameter settings, etc. and via which the user can interact with the console 176 and the other devices of the GPN 190 to enhance his/her gaming experience.

The peripheral devices 102, 108, 192, 195, and 200 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 195 in a single hop (e.g., over a proprietary RF link) and with the device 192 in a single hop (e.g., over a Bluetooth or Wi-Fi direct link), while the tablet may communicate with the basestation 195 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 184 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one or more devices of the GPN 190.

In an example scenario, the headset 200 may communicate with the gaming console 176 and then placed in a charger when finished or upon indication from the headset 200 that the battery is depleted. Users often leave headsets on when placing in a charger, thereby leaving unneeded circuitry on and slowing charging. Therefore, the headset 200 may be placed in a wireless charger that communicates via RF to the headset to configure various function of the headset, such as powering down all unneeded circuitry while powering up charging control circuitry and/or charging indicators, for example, on the headset 200. The charging apparatus is described further respect to FIGS. 3 and 4.

Figure 1C:
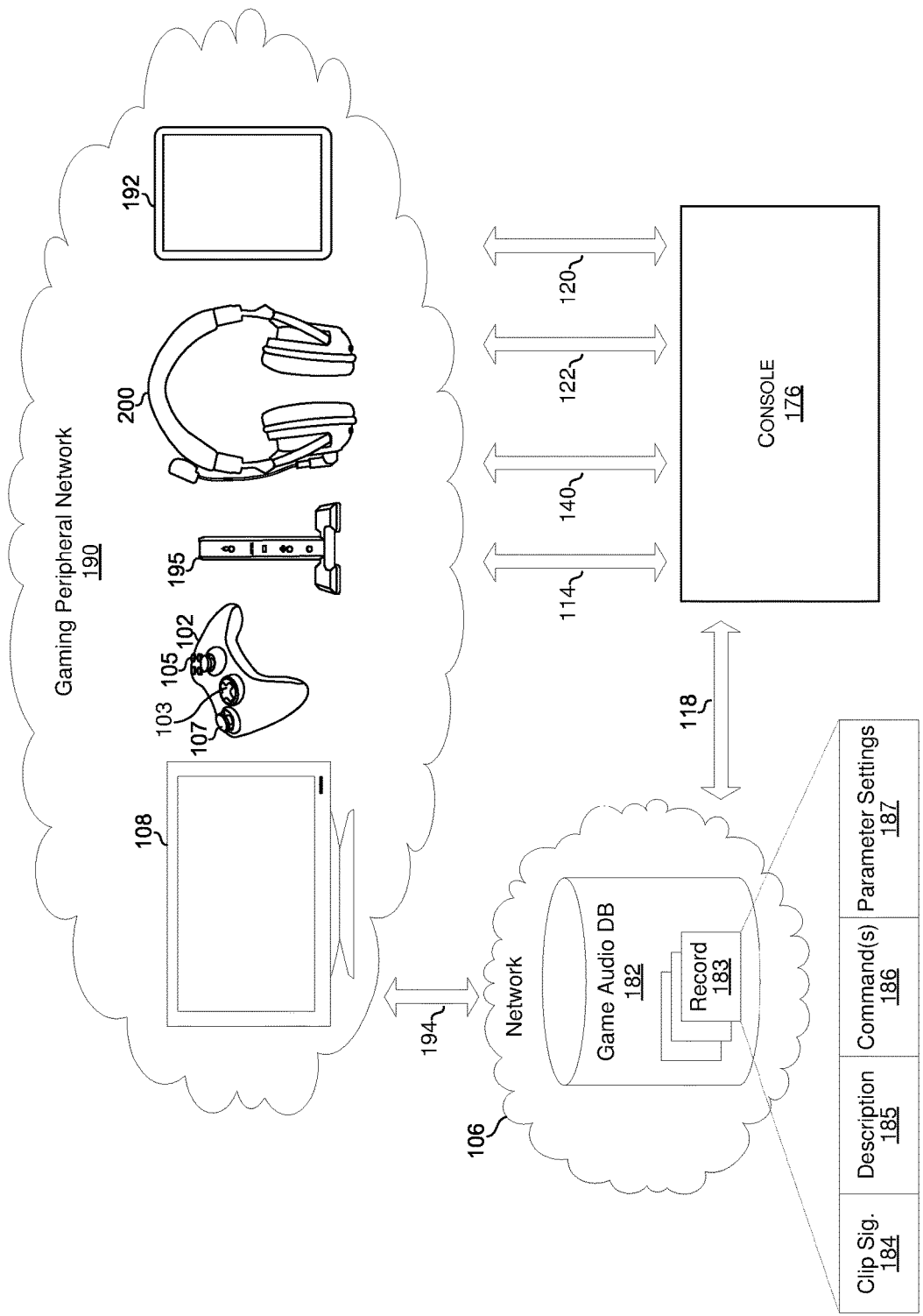
FIG. 1C depicts the example gaming console and an associated network of peripheral devices.

While the headset 200 in FIGS. 1A-1C is shown communicating with a gaming console 176, the disclosure is not so limited, as this is merely an example use for the headset 200. Accordingly, the headset 200 may be utilized in other applications, such as a cellular phone headset, music player headset, or as a headset in any other communications application and/or protocol.

Figure 2A:
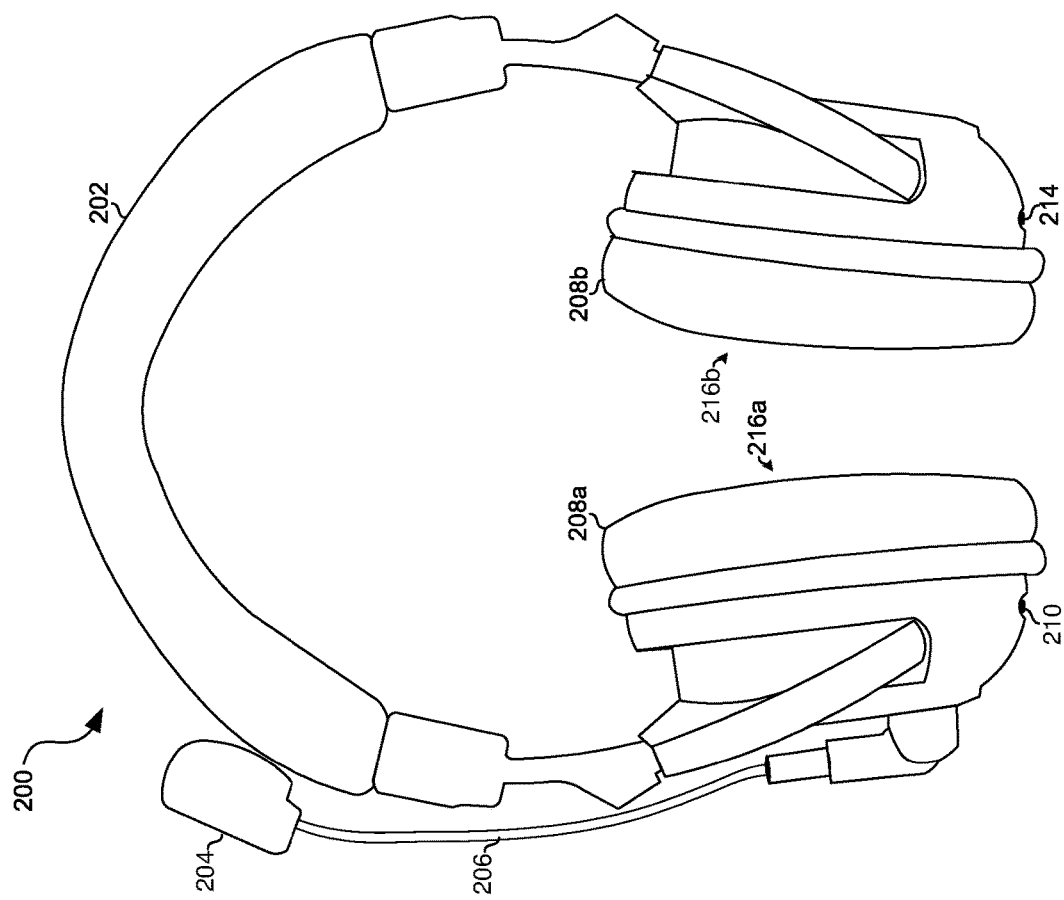
FIGS. 2A and 2B depict two views of an example embodiment of a gaming headset.
Figure 2B:
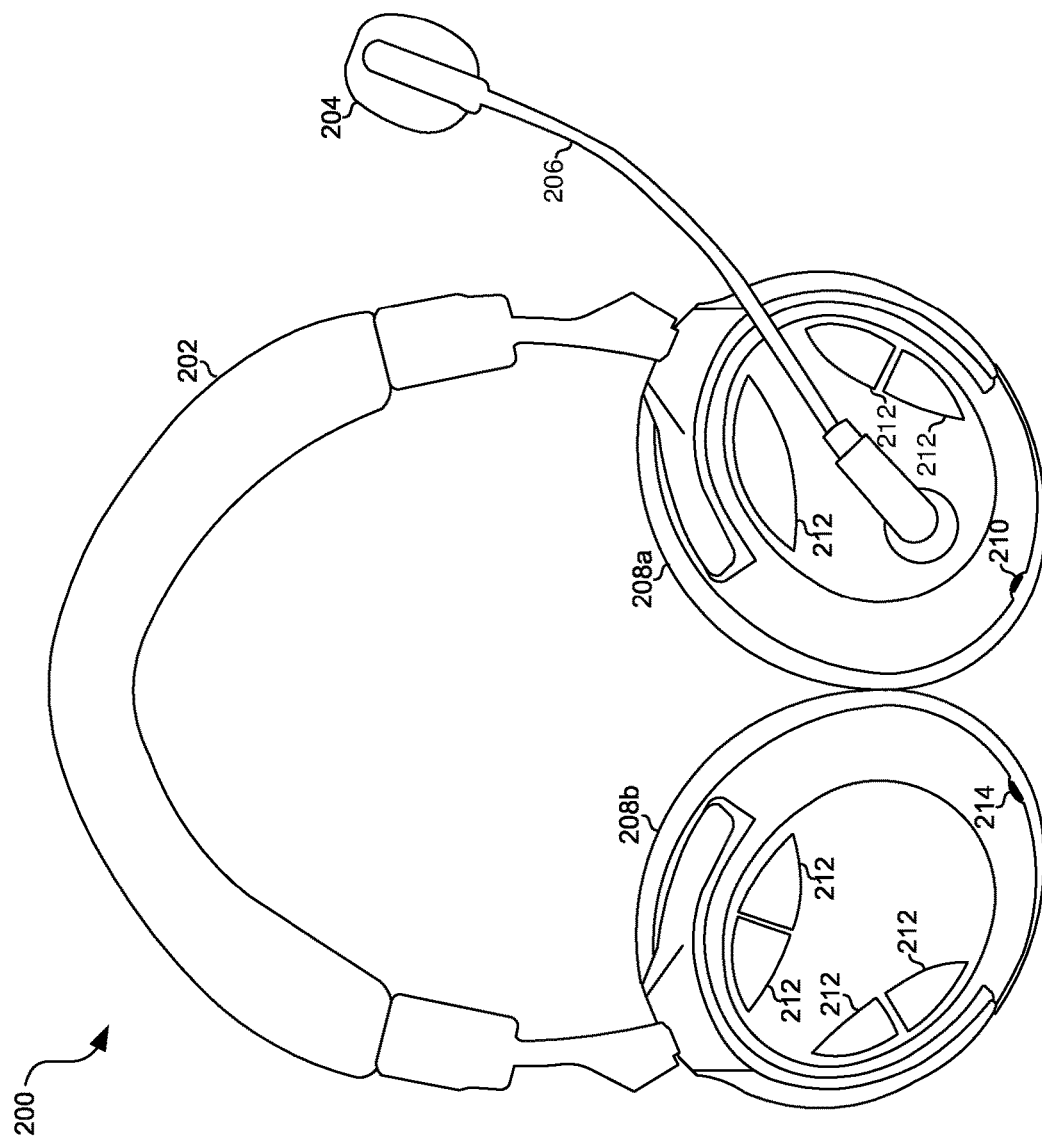

Referring to FIGS. 2A and 2B, there is shown two views of an example headset 200 that may present audio output by a gaming console such as the console 176. The headset 200 comprises a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 converts acoustic waves (e.g., the voice of the person wearing the headset) to electric signals for processing by circuitry of the headset and/or for output to a device (e.g., console 176, basestation 195, a smartphone, and/or the like) that is in communication with the headset.

The speakers 216a and 216b convert electrical signals to soundwaves.

The user controls 212 may comprise dedicated and/or programmable buttons, switches, sliders, wheels, etc., for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, or the like) with another computing device, and/or the like.

The connector 214 may be, for example, a USB port. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

In an example scenario, the headset 200 may be charged wirelessly when placed in a charging dock, and may receive instructions communicated from the dock to power down unneeded circuitry while charging. For example, audio processing, control circuitry, portions of communications circuitry, and indictor circuitry may be powered down upon receiving instructions from the charging dock.

Figure 2C:
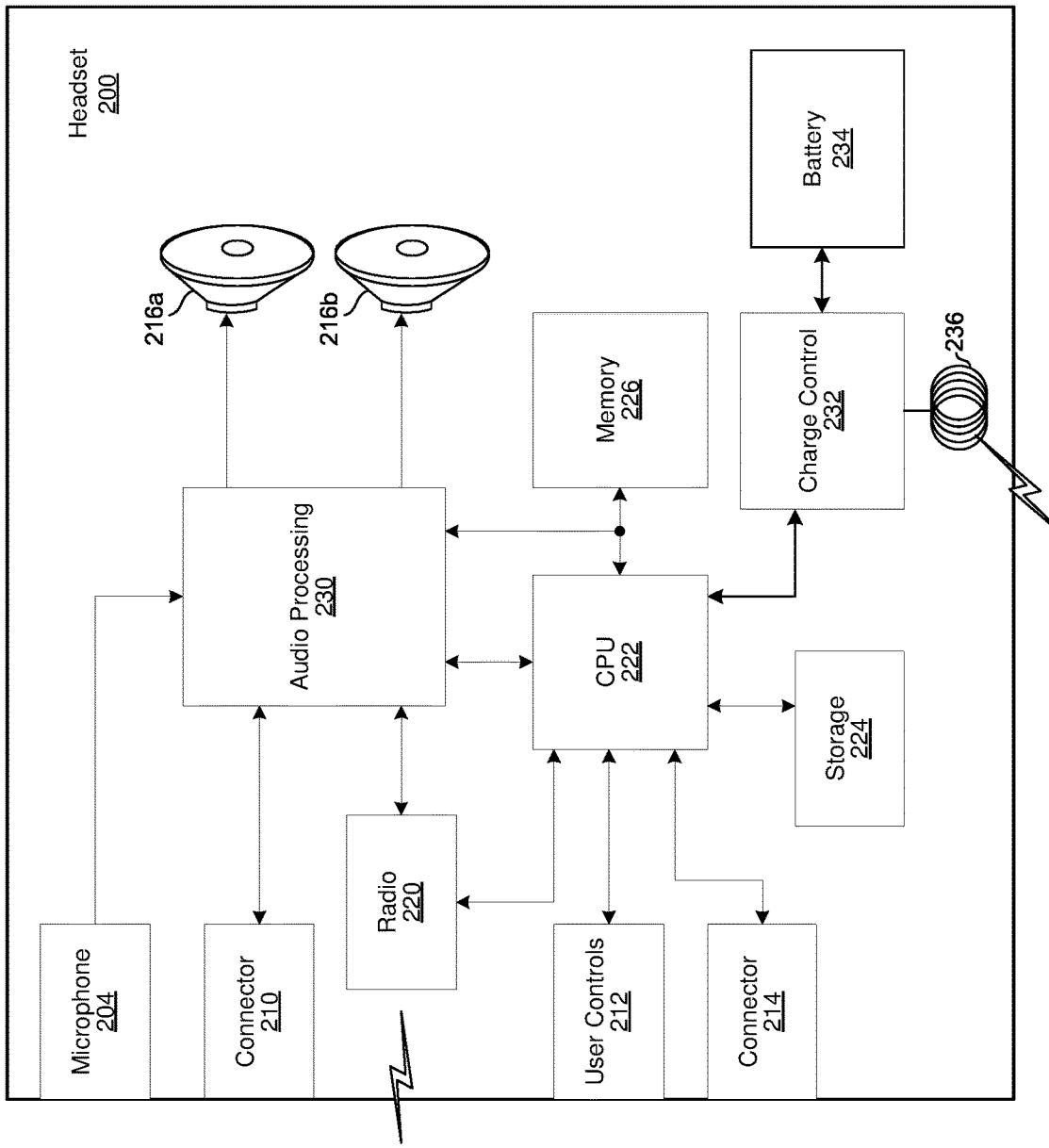
FIG. 2C depicts a block diagram of the example headset of FIGS. 2A and 2B.

FIG. 2C depicts a block diagram of the example headset 200. In addition to the connector 210, user controls 212, connector 214, microphone 204, and speakers 216a and 216b already discussed, shown are a radio 220, a CPU 222, a storage device 224, a memory 226, an audio processing circuit 230, a charge control module 232, a battery 234, and an induction coil 236.

The radio 220 may comprise radio frequency (RF) circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation such as the basestation 195).

The CPU 222 may comprise circuitry operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The storage device 224 may comprise, for example, FLASH or other nonvolatile memory for storing data which may be used by the CPU 222 and/or the audio processing circuitry 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuitry 230. As another example, one or more parameter settings may determine, at least in part, a frequency response of one or more filters that operate on audio signals in the audio processing circuitry 230.

As yet another example scenario, the parameter settings may comprise settings for charging of the headset 200 when placed in a charging dock. When the dock detects the presence of the headset 200, it may communicate signals to the headset 200 via the radio 220 for controlling functions during charging. For example, the circuitry that is not needed for charging may be powered down during charging, based on commands received from the charging dock. In one example, the charging dock may send a simple command indicating that the headset 200 is docked and the CPU 222 and charge control circuitry may determine circuitry to power down. In another example, the charging dock may communicate commands to the headset specifying what functions and/or circuitry to power down.

Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The memory 226 may comprise volatile memory used by the CPU 222 and/or audio processing circuit 230 as program memory, for storing runtime data, etc.

The audio processing circuit 230 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing may be performed on game, chat, and/or microphone audio that is subsequently output to speaker 216a and 216b. Additionally, or alternatively, the processing may be performed on chat audio that is subsequently output to the connector 210 and/or radio 220.

The charge control module 232 may comprise suitable circuitry, logic, and/or code for controlling the charging of the battery 234. Accordingly, the charge control module 232 may receive electrical current from the induction coil 236, which in turn receives electromagnetic energy from a charging induction coil in the charging station via inductive coupling. The charge control module may also receive instructions from the CPU 222, which may receive instructions from a charging station via the radio 230.

Figure 3:
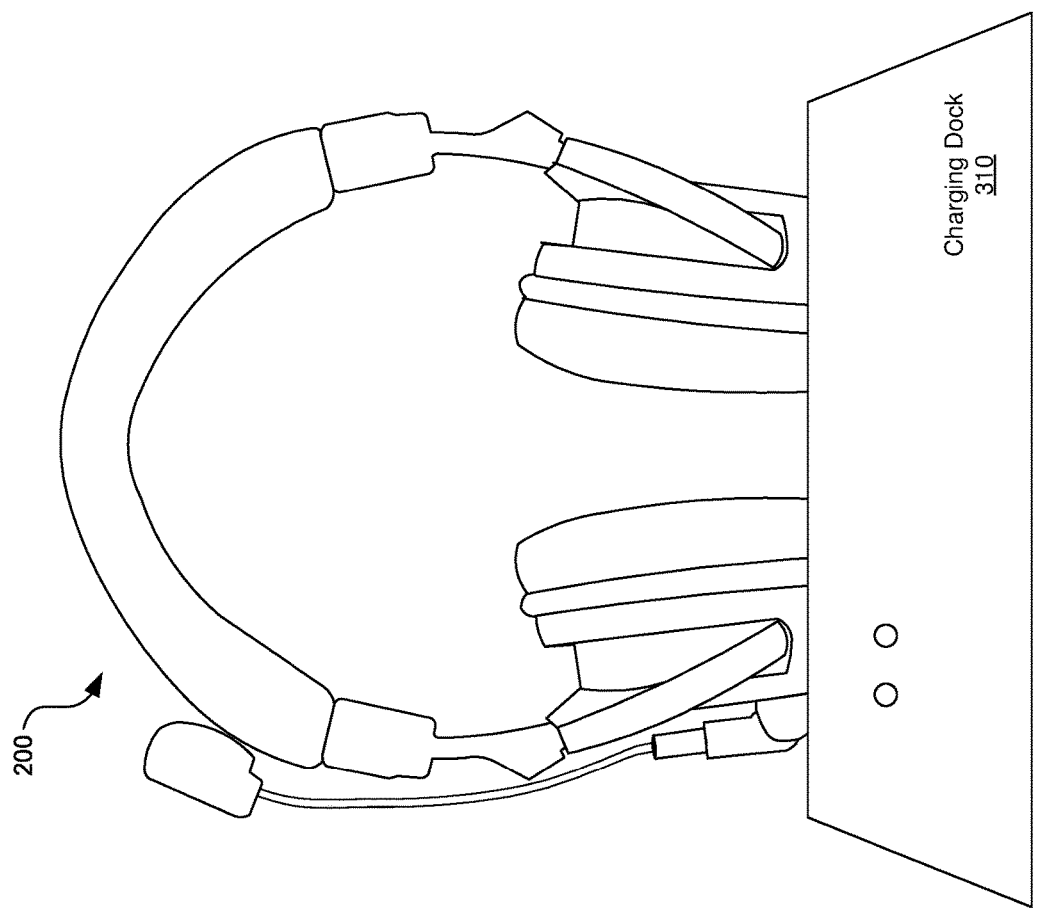
FIG. 3 depicts a headset in a charging dock.
Figure 4:
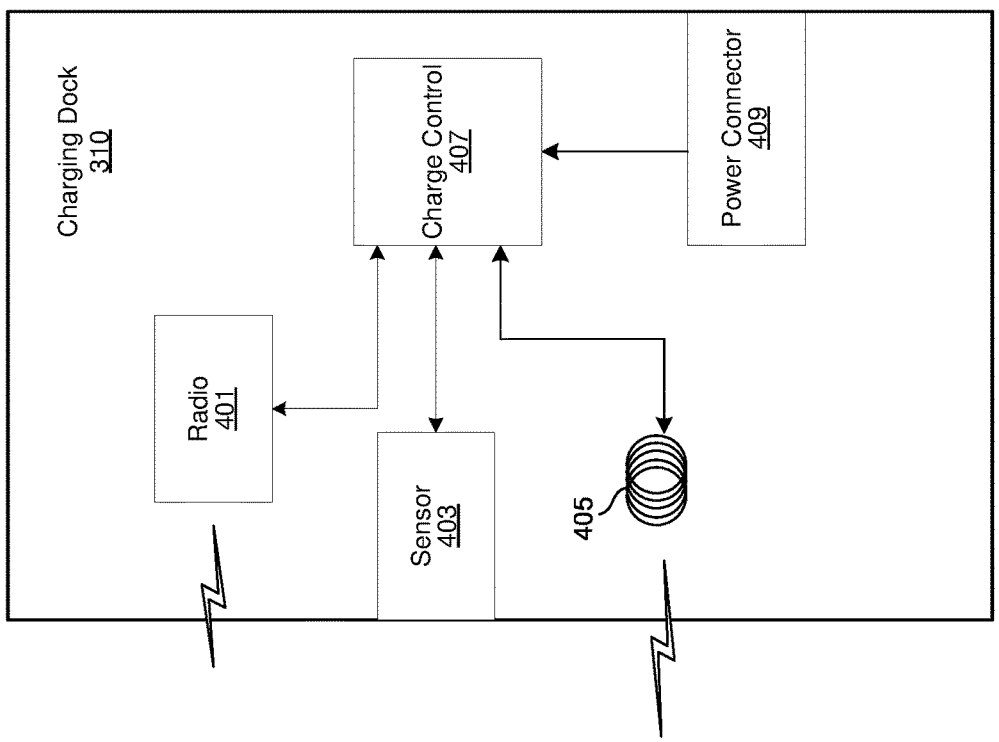
FIG. 4 depicts a charging dock with charging control command functionality.

In an example scenario, an alternating current in the induction coil 236 may be utilized by the charge control module 232 to charge the battery 234. In this manner, the battery 234 may be charged without the need for any physical connection to a charging station, but merely by being in close proximity, with the distance determined by the induction coil 236 and associated coil in the charging station. Furthermore, the headset 200 may receive commands wirelessly from the charging station in which the headset is placed, as shown in FIGS. 3 and 4. The charging station may sense the presence of the headset 200 and activate an induction coil in the charging station that is inductively coupled to the induction coil 236 in the headset 200. In addition, the radio 220 may receive signals communicated from the charging station, indicating that the headset 200 is now docked in the charging station and can power down unneeded functions of the headset 200. For example, the audio processing circuit 230 and portions of the CPU 222 not needed for charging may be shut down. Similarly, indicator lights or displays may be powered down, for example.

By placing sensing circuitry in the charging station and communicating charging/power down commands by the radio 220, which is also used for communicating audio signals to and from the headset 200, full charging control may be enabled without the need for proximity sensing and dedicated charging control communications circuitry in the headset 200.

FIG. 3 depicts a headset in a charging dock. Referring to FIG. 3, there is shown the headset 200 in a charging dock 310. The headset 200 and the charging dock 310 may each comprise one or more induction coils for inductive coupling of electromagnetic energy from the dock 310 to the headset 200. In this manner, no connectors or other physical connection between the charging dock 310 and the headset 200 is needed to charge the battery in the headset 200.

In addition, wireless commands may be communicated from the charging dock 310 to the headset 200 via the normal RF communication circuitry in the headset 200 through which audio and other signals are communicated. The commands may comprise simple instructions such as "power down" or may be more detailed, specifically indicating which circuitry should be powered down, and therefore may be utilized to power down portions of the headset 200 that are not needed during charging, which may decrease charging time.

FIG. 4 depicts a charging dock with charging control command functionality. Referring to FIG. 4, there is shown an example schematic of the charging dock 310 comprising a radio 401, a proximity sensor 403, a charge induction coil 405, a charge control module 407, and a power connector 409.

The radio 401 may be similar to the radio 220 described with respect to FIG. 2, although may comprise more simplified (or greater) functionality. Accordingly, the radio 401 may comprise RF circuitry operable to communicate in accordance with one or more standardized (such as, for example, the IEEE 802.11 family of standards, the Bluetooth family of standards, and/or the like) and/or proprietary wireless protocol(s).

The proximity sensor 403 may comprise circuitry for determining the proximity of a headset, such as the headset 200, and may comprise a Hall sensor, for example, which may sense when a magnet, such as magnets in the speakers of the headset, is within range. Accordingly, when a headset is placed in close proximity, such as in a cradle or docking port, the sensor 403 may indicate this to the charge control module 407 so that it may start a charge process via the charge induction coil 405.

The power connector 409 may comprise a port into which a power cord may be coupled to power the charging dock 310.

In operation, when a headset is placed in or on the charging dock 310, the proximity sensor 403 may indicate the presence of the headset to the charge control module 407, which may begin a charge process via the charge induction coil 405. In addition, the charge control module 407 may communicate commands to the docked headset via the radio 401, which may communicate the signals using the same protocol used by the headset for sending and receiving audio signals.

The commands sent to the headset via the radio 401 may comprise powerdown commands, shutting down the headset, for example, or powering down all circuitry except for that needed for charging. Once charging is completed, either sensed by current in the charging induction coil 405 or via a status message received from the headset, the charging dock 310 may communicate a command to the headset to power down completely.

Figure 5:
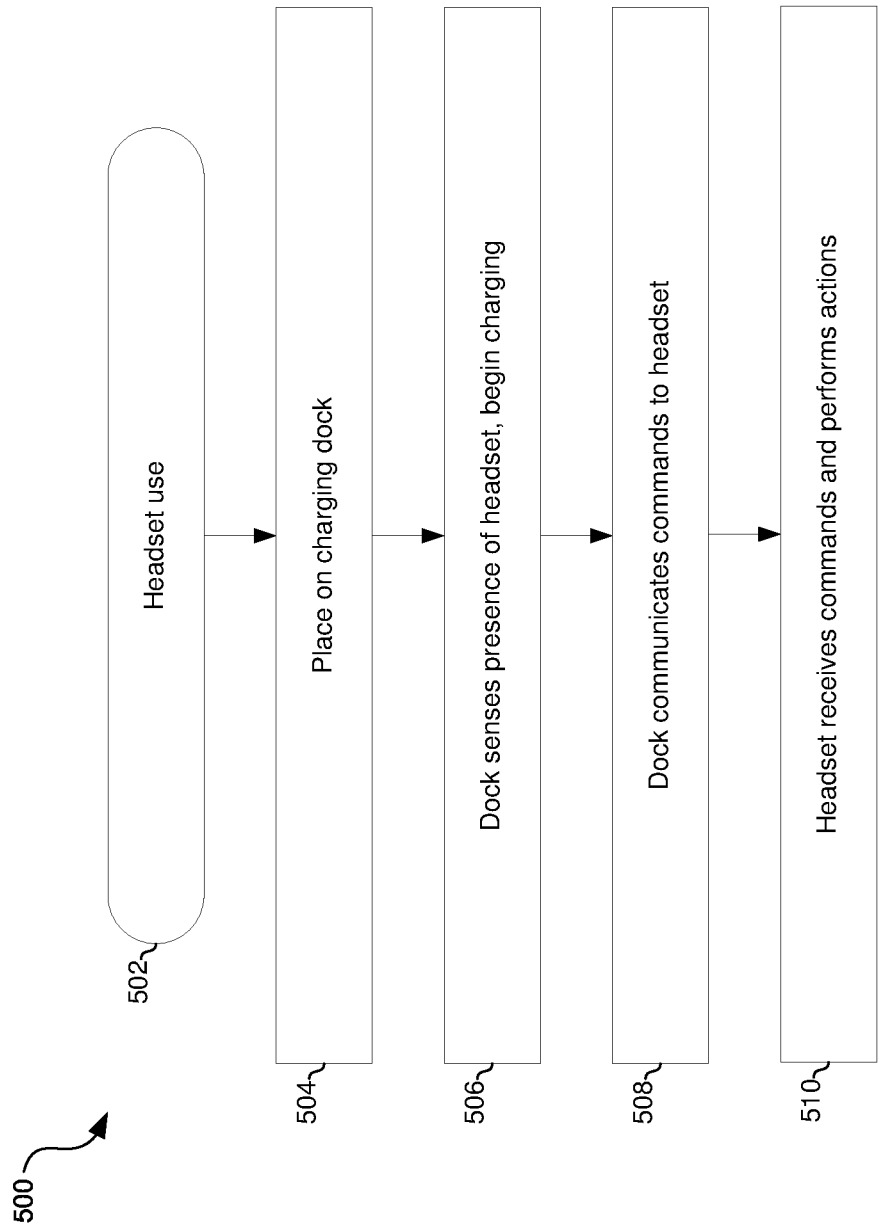
FIG. 5 is a flowchart illustrating an example process for headset charging.

FIG. 5 is a flowchart illustrating an example process for headset microphone mode selection. Referring to FIG. 5, there is shown a flow chart 500, comprising a plurality of example steps.

In starting step 502, a headset (e.g., the headset 200) may be turned on and may be utilized to send, receive, and emit audio signals. In step 504, the headset may be placed in or on the charging dock for charging.

In step 506, a sensor in the charging dock may indicate to charging circuitry in the charging dock that the headset is present and a charging process may begin via inductive coupling, for example.

In step 508, the charging circuitry may communicate commands to the radio circuitry in the headset. In step 510, the radio in the headset may receive the commands from the charging dock, which may comprise commands to power down the headset, or at least portions not needed for charging. For example, audio processing circuitry and some or all data processing circuitry may be powered down while charging to speed charge time.

In an example embodiment of the disclosure a headset wireless charging dock is disclosed and may comprise a charging dock comprising a radio frequency (RF) radio, a charging induction coil, and a proximity sensor, the charging dock being operable to: sense a presence of a headset using the proximity sensor, wirelessly charge a battery in the headset utilizing the charging induction coil, and wirelessly communicate a command, using the RF radio, to the headset to power down at least a portion of circuitry in the headset. The charging dock may communicate the command to the headset utilizing a protocol used by the headset to receive audio signals.

The charging dock may communicate the command to a RF radio in the headset that is used to receive audio signals. The command communicated to the headset may power down audio processing circuitry in the headset. The charging induction coil may be inductively coupled to a coil in the headset to wirelessly charge the battery in the headset. The proximity sensor may comprise a Hall sensor. The charging dock may communicate a power down command to the headset when the charging dock senses the battery in the headset is fully charged. The charging dock may sense the battery in the headset is fully charged by a measurement of current in the charging induction coil or by receiving a charging complete message from the headset. The headset may comprise a gaming headset.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A charging dock, the charging dock comprising:
   a sensor operable to determine a presence of a device;
   a coil operable to charge a battery of the device via inductive coupling; and
   a radio operable to wirelessly communicate a power down command to the device when the battery of the device is fully charged.

2. The charging dock of claim 1, wherein the device is a headset.

3. The charging dock of claim 1, wherein the inductive coupling provides a wireless charge.

4. The charging dock of claim 1, wherein the radio is operable to communicate with the device utilizing a protocol used by the device to receive audio signals.

5. The charging dock of claim 1, wherein the radio is operable to communicate with the device via an RIF radio in the device.

6. The charging dock of claim 1, wherein the power down command instructs the device to power down audio processing circuitry.

7. The charging dock of claim 1, wherein the coil is inductively coupled to a coil in the device to wirelessly charge the battery of the device.

8. The charging dock of claim 1, wherein the sensor comprises a proximity sensor.

9. The charging dock of claim 1, wherein the charging dock is operable to determine, via a measurement of current in the coil, that the battery of the device is fully charged.

10. The charging dock of claim 1, wherein the charging dock is operable to receive a charging complete message from the device.

11. A method for charging a device, the method comprising:
    determining a presence of a device via a sensor;
    charging a battery of the device via inductive coupling; and
    wirelessly communicating a powerdown command to the device when the battery of the device is fully charged.

12. The method of claim 11, wherein the device is a headset.

13. The method of claim 11, wherein the inductive coupling provides a wireless charge.

14. The method of claim 11, wherein the wirelessly communicating utilizes a protocol used by the device to receive audio signals.

15. The method of claim 11, wherein the device comprises an RF radio.

16. The method of claim 11, wherein the power down command instructs the device to power down audio processing circuitry.

17. The method of claim 11, wherein the coil is inductively coupled to a coil in the device to wirelessly charge the battery of the device.

18. The method of claim 11, wherein the sensor comprises a proximity sensor.

19. The method of claim 11, wherein the method comprises determining, via a measurement of current in the coil, that the battery of the device is fully charged.

20. The method of claim 11, wherein the method comprises receiving a charging complete message from the device.

\* \* \* \* \*